Figure 1:
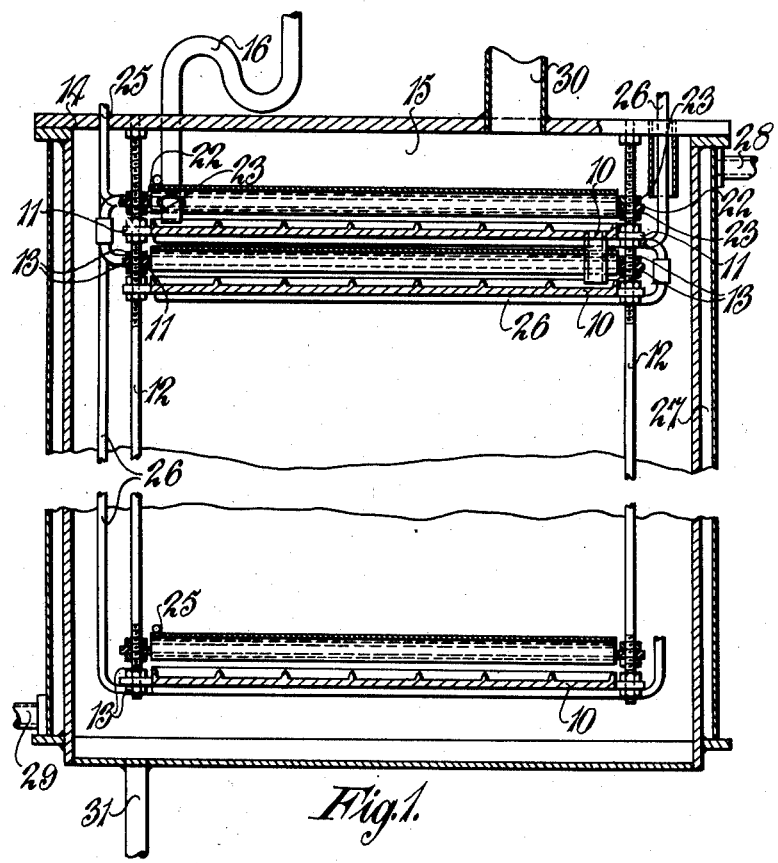

April 17, 1934.  C. R. BURCH ET AL  1,955,321
VACUUM DISTILLATION
Filed Aug. 22, 1928    4 Sheets-Sheet 1

INVENTORS
Cecil Reginald Burch &
Frank Edmund Bancroft
BY
ATTORNEY

April 17, 1934.  C. R. BURCH ET AL  1,955,321
VACUUM DISTILLATION
Filed Aug. 22, 1928  4 Sheets-Sheet 2

INVENTORS
Cecil Reginald Burch &
Frank Edmund Bancroft
BY
ATTORNEY

April 17, 1934.  C. R. BURCH ET AL  1,955,321
VACUUM DISTILLATION
Filed Aug. 22, 1928   4 Sheets-Sheet 3

INVENTORS
Cecil Reginald Burch &
Frank Edmund Bancroft
BY
ATTORNEY

April 17, 1934.

C. R. BURCH ET AL 1,955,321

VACUUM DISTILLATION

Filed Aug. 22, 1928

4 Sheets-Sheet 4

INVENTOR
Cecil Reginald Burch &
Frank Edmund Bancroft
BY
ATTORNEY

Patented Apr. 17, 1934

1,955,321

UNITED STATES PATENT OFFICE 1,955,321

VACUUM DISTILLATION

Cecil Reginald Burch, Stretford, Manchester, and Frank Edmund Bancroft, Fallowfield, near Manchester, England, assignors to Associated Electrical Industries Limited, a company of Great Britain Application August 22, 1928, Serial No. 301,193
In Great Britain September 21, 1927

2 Claims. (Cl. 202—52)

This invention relates to vacuum distillation of organic materials, such for example as mineral oils, and has for its object the evaporative distillation of such materials at the lowest temperatures practicable consistent with reasonable speed of operation, whereby decomposition ("cracking") of the material, hereinafter called the distilland, and the tendency for materials which are chemically speaking mixtures to form azeotropic mixtures, that is to say, mixtures the composition of which is unaltered by repeated fractional distillation at the same pressure, may be reduced or even entirely avoided.

The lower limit of temperature at which decomposition or cracking takes place is fairly sharply defined and varies but little with change of pressure, and if the pressure over the distilland be reduced the temperature at which distillation of a given fraction or distillate takes place is lowered. Therefore, by reducing the pressure at which distillation of an organic body is carried out, the distillation may be effected at a temperature below the point at which cracking sets in. The more volatile fractions of organic materials can be evaporated at temperatures below that at which decomposition or cracking takes place and at commercially practicable pressures of 1 mm. of mercury and over. The less volatile fractions can, however, only be separated without risk of chemical changes at a much lower pressure.

When materials are distilled in a high degree of vacuum, that is at pressures substantially less than 1 mm. of mercury, the rate of operation, or the rate at which condensate is received, may be very small owing to the low density of the distillate vapour at the pressure at which the operation is carried out and owing to the low rate of diffusion of the distillate vapour from the surface of the distilland through the passages leading to the condensing surface. The rate of operation of an apparatus distilling a particular distilland at a particular degree of vacuum depends directly upon the area of, and inversely upon the length of, the passage between the surface of the distilland and the condensing surface.

According to the present invention a process of distilling organic materials consists in subjecting the distilland to heat while its surface is exposed in proximity to a condensing surface, from which the condensate can be collected, the distilland and the condensing surface being arranged in a single chamber within which the pressure is reduced to a small fraction of atmospheric pressure. Before the commencement of the distilling operation any gas or gases in the distilland should preferably be removed.

In order that the principle of the invention may be understood the evaporative distillation of a pool of liquid completely freed from dissolved gas within a large perfectly evacuated container may be considered. If it be assumed that at any instant a small shallow pool of liquid completely freed from dissolved gas and containing at the given instant no gas or vapour whatsoever, is subjected to a certain temperature within a large perfectly evacuated space, there are two possible modes of behaviour. Firstly, bubbles of vapour may form throughout the shallow pool and the complete pool may be almost instantly converted into foam, and then also almost instantly into vapour, the temperature meanwhile being maintained constant. As examples of liquids which behave in this first mode, water, petrol, benzene, acetone and ether may be mentioned. In the second mode of behaviour no bubbles are formed but vapour is given off from the surface of the pool until, at the end of a definite time interval, the pool is completely evaporated and the vapour is diffused uniformly throughout the very large space, the density and pressure of the vapour when so diffused being very small indeed in comparison with the density and pressure of the said vapour when in equilibrium with the unevaporated liquid when the latter is contained in a small vessel containing no other gas. As examples of liquids which behave in this second mode, lubricating oils, transformer oil, paraffin wax and petroleum may be mentioned.

When the distilland is of such a nature that it behaves in the second mode above described it can be distilled without the formation of bubbles and without spraying or splashing, and the distance between the surface of the distilland and the condensing surface may be so determined with respect to the pressure within the chamber that it is less than the length of the mean free path of a molecule of distillate in the residual gas within the chamber, other than the distillate, at a density of that other residual gas which exists between the surface of the distilland and the condensing surface.

When, however, it is required to distill a distilland of such a nature that it behaves in the first mode hereinbefore described, distillation may be accompanied by the formation and bursting of bubbles, spraying or splashing, and baffles may be so disposed between the surface of the distilland and the condensing surface that a particle leaving the surface of the distilland and travelling in an approximately straight path is precluded by a part of the baffles from striking the condensing surface. Contamination of the condensate by distilland distributed by spraying or splashing is thus avoided. Preferably the baffles are themselves heated to a temperature near to that of the distilland so that condensation of the distillate thereon is precluded.

The invention also includes a vacuum distilling apparatus comprising a chamber containing a cooled condensing surface, upon which the distillate is condensed and from which the condensate is collected, disposed in proximity to trays for containing the distillate which are adapted to be heated.

When the apparatus is for use in distilling distillands which can be distilled without the formation of bubbles and without spraying or splashing the distance between the surface of the distilland and the condensing surface may be so determined with respect to the pressure within the vessel that it is less than the length of the mean free path of a molecule of distillate in the residual gas within the chamber, other than the distillate, at a density of that other residual gas which exists between the surface of the distilland and the condensing surface. Moreover, the condensing surface may be so arranged that the great majority of molecules of distillate leaving the surface of the distilland impinge upon it and upon no other surface. Preferably the distance between the surface of the distilland and the condensing surface is of the same order as the mean free path of a molecule of distillate in distillate vapour at the density obtaining within the space between the surface of the distilland of the condensing surface.

When, however, it is required to distill a distilland of such a nature that distillation may be accompanied by the formation and bursting of bubbles, spraying or splashing, the distilling apparatus has baffles so disposed between the condensing surface and the surface of the distilland that a particle leaving the surface of the distilland and travelling in an approximately straight path is precluded from striking the condensing surface. Such baffles are preferably heated to a temperature near to that of the distilland so that condensation of the distillate thereon is substantially precluded.

The invention also includes the combination with a distilling apparatus of the nature set forth, of one or more chambers within which successively decreasing pressures are maintained and within which the distilland may be subjected to successively increasing temperatures for the purpose of removing from the distilland any dissolved gases which may be present before the introduction of the distilland to the still proper.

The complete process of distillation when carried out continuously consists in passing the distilland through one or more chambers at increasingly reduced pressure and, if desired, elevated temperature for the removal of dissolved gases and thereafter heating the distilland in a chamber at low pressure with its surface in close proximity to a cooled condensing surface and withdrawing the distillate, or the residue, or both, from the still by means of one or more stages of exhaust pumps.

It will be seen that the invention when applied to the distillation of distillands which behave in the second of the two modes described, provides for the realization to the greatest possible extent of the beneficial evaporative properties of the hypothetical, very large and perfectly evacuated container hereinbefore described, but without the necessity for such perfect evacuation as is there assumed.

Owing to the disposition of the condensing surface close to the surface of the distilland as hereinbefore described the majority of molecules evaporated from the distilland move from the surface of the distilland to the condensing surface without colliding with molecules of gas other than distillate vapour and without colliding more than a few times, as for instance, once or twice, with other molecules of distillate vapour. If the distance between the surface of the distilland and the condensing surface be made sufficiently small the majority of molecules of distillate travelling through that distance will not collide either with molecules of residual gas or with other molecules of distillate.

If the condition set forth is satisfied no appreciable gain can be realized by more completely evacuating the chamber, since if the majority of distillate molecules in their passage from the surface of the distilland to the condensing surface do not collide with molecules of residual gas they are not appreciably interfered with in this passage. The distillate molecules may, however, be permitted to collide with one another rather more frequently, say for example, twice in their passage, since these have a general motion in the desired direction, almost all of them being condensed when they impinge upon the condensing surface. Thus collisions between distillate molecules are less likely to divert the distillate molecules back into the distilland.

The actual magnitude of the distance between the surface of the distilland and the condensing surface may be readily determined with sufficient precision by reference to modern text books on the dynamic theory of gases and to tables of physical constants, such as "Physical and Chemical Constants and Some Mathematical Functions", by G. W. C. Kaye and T. H. Laby, published by Longmans Green & Co., 39, Paternoster Row, London, in 1921 (pages 34 and 35). For example, the mean free path of the mercury molecule in saturated mercury vapour at room temperature is approximately 4 cm., and if it be assumed that the effective diameter of the molecule of distillate vapour is the same as that of mercury, the mean free path of the distillate vapour in saturated mercury vapour at room temperature will also be 4 cm. Now mercury vapour constitutes the principal if not the only residual gas within a vessel exhausted by an efficient condensation mercury vapour pump, such as is commonly used for producing a vacuum of the degree contemplated. If the distance between the surface of the distilland and the condensing surface be 2 cm., 60.07% of the molecules of distillate will reach the condensing surface without colliding with mercury molecules. If the distance between the surface of the distilland and the condensing surface be reduced to 1 cm. 77.5% of the molecules of distillate will reach the condensing surface without collision with mercury molecules. Thus in the former case the apparatus will have a speed of evaporation more than 60.07% of the speed of evaporation which it would have if no gas other than the distillate vapour were present, and in the second case the speed of evaporation would be more than 77.5% of the speed of evaporation when no gas other than distillate were present.

For the purpose of comparison a case may be considered in the above conditions, the distance between the surface of the distilland and the condensing surface being 20 cm. In this case only about one molecule in 20,000 of the distillate vapour will escape collision in its passage towards the condensing surface, and the average time taken by any given molecule to complete its passage will be of the order of 100 times as long as the time taken for a molecule to complete the 2 cm. passage. In fact it may be said that if the distance between the surface of the distilland and the condensing surface is so great that the distillate vapour molecules collide with gas many times in their passage to the condensing surface, the average time taken by the molecule to travel from the surface of the distilland to the condensing surface, the pressure being maintained constant, is proportional to the square of the distance between the surface of the distilland and the condensing surface.

In carrying out the present invention it is preferred to operate the apparatus at a pressure of about 1 dyne/cm² which pressure can easily be obtained with mercury condensation pumps, although other kinds of pumps may readily be used, and it is preferred to arrange the condensing surface to be about 1 cm. from the surface of the distilland.

When however, it is required to distill organic distillands which behave in the first mentioned mode and may distill with splashing or spraying, it is in general not practicable so to locate the condensing surface that the distance between the condensing surface and the surface of the distilland is less than the length of the mean free path of a molecule of distillate in the residual gas within the chamber other than the distillate at a density of that other residual gas which exists between the surface of the distilland and the condensing surface owing to the desirability of the interposition of baffles. Moreover, where baffles are used the majority of molecules of distillate leaving the surface of the distilland will first impinge upon the baffles and will thereafter diffuse through the chamber, ultimately reaching the condensing surface. It is advantageous that there should be as few collisions as possible between molecules of distillate and other molecules during the diffusion and consequently it is desirable that the condensing surface be arranged as near as practicable to the surface of the distilland. By appropriate dimensioning and evacuation of the chamber the speed of operation of the apparatus which incorporates baffles may be made of the order of $\frac{1}{10}$th of the speed of operation obtainable by the apparatus in which the condensing surface is located at a distance from the surface of the distilland less than the mean free path of a molecule of distillate vapour in the residual gas in the chamber. The degree of separation may also be made almost equally high.

Either form of the distilling apparatus may be so designed that the pressures at several parts of the chamber may be different. The discharge of distillate from the edge of a tray past the edge of another tray or a baffle or condensing surface is so directed as to entrain gas within the chamber and assist evacuation of other parts thereof. Moreover, the condensing surfaces in any one distilling apparatus may be sub-divided into a plurality of parts, each of which parts is provided with its own discharge, by way of which the condensates of the several parts may be separately collected. Thus, by maintaining different portions of the distilland at different temperatures and/or different pressures within different zones of a distilling apparatus a plurality of fractions may be obtained in one distilling apparatus from a single original distilland.

Figure 2:
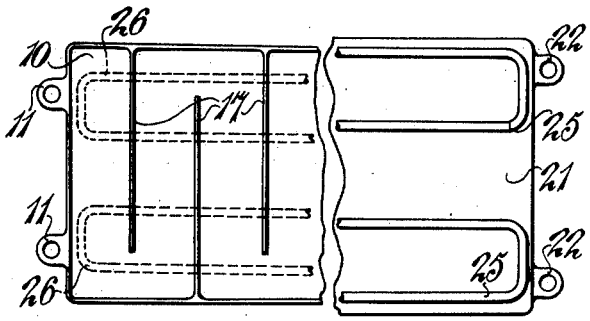
Figure 3:
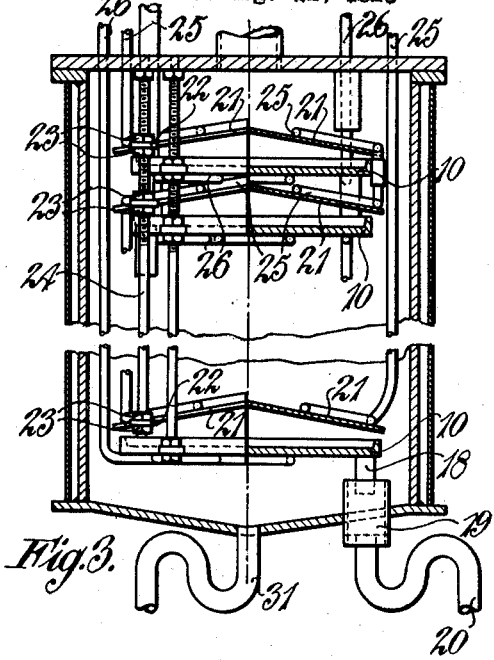
Figure 4:
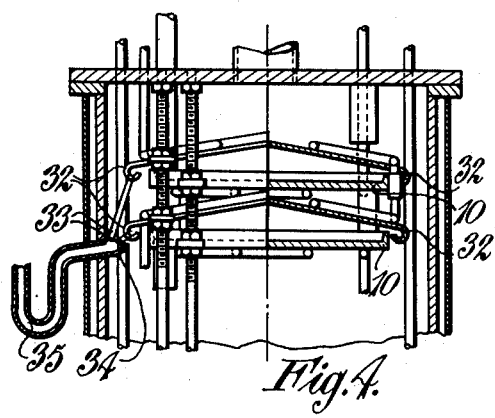
Figure 5:
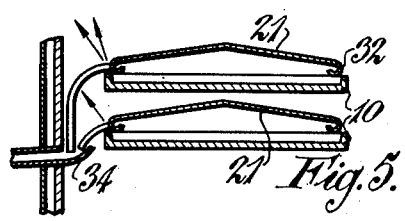

In the accompanying drawings Fig. 1 is a longitudinal vertical section through a distilling apparatus suitable for the distillation of distillands which behave in the second mode; Fig. 2 is a part plan view of one of the trays for holding the distilland shown in Fig. 1 and a part plan view of one of the condensing surfaces shown in Fig. 1; Fig. 3 is a vertical section in a plane perpendicular to that of Fig. 1; Fig. 4 is a vertical section in the same plane as Fig. 3 but illustrating a modification of distilling apparatus suitable for obtaining several fractions from one distilland in a single apparatus; Fig. 5 is part of a section in the same plane as Figs. 3 and 4 showing a modification in which the discharge of distillate from the edge of a tray past the edge of the condensing surface is so directed as to entrain gas and assist in the evacuation of the lower parts of the apparatus.

Figure 6:
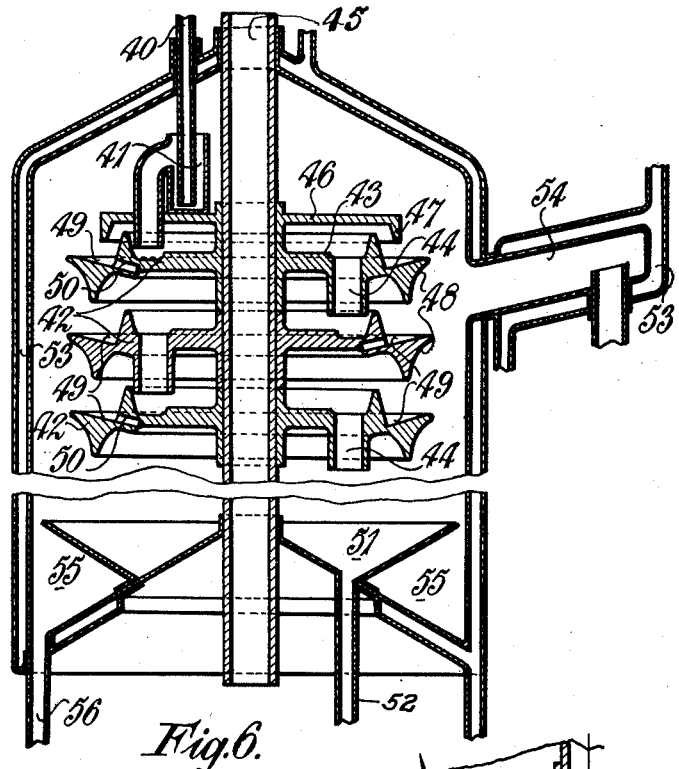
Figure 8:
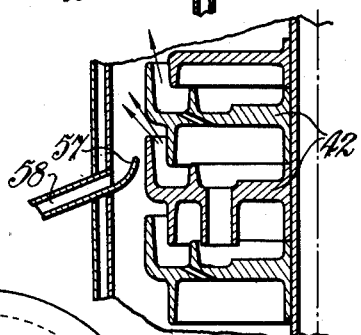
Figure 7:
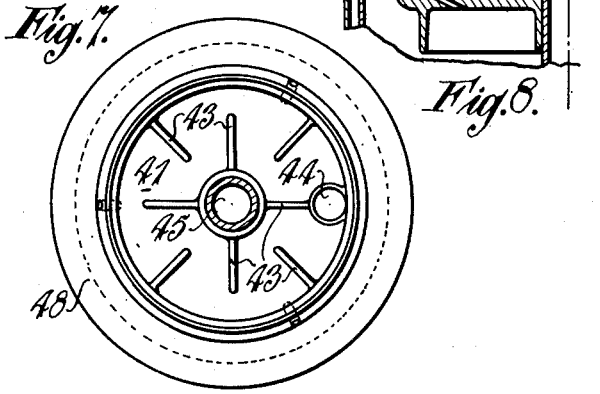
Figure 9:
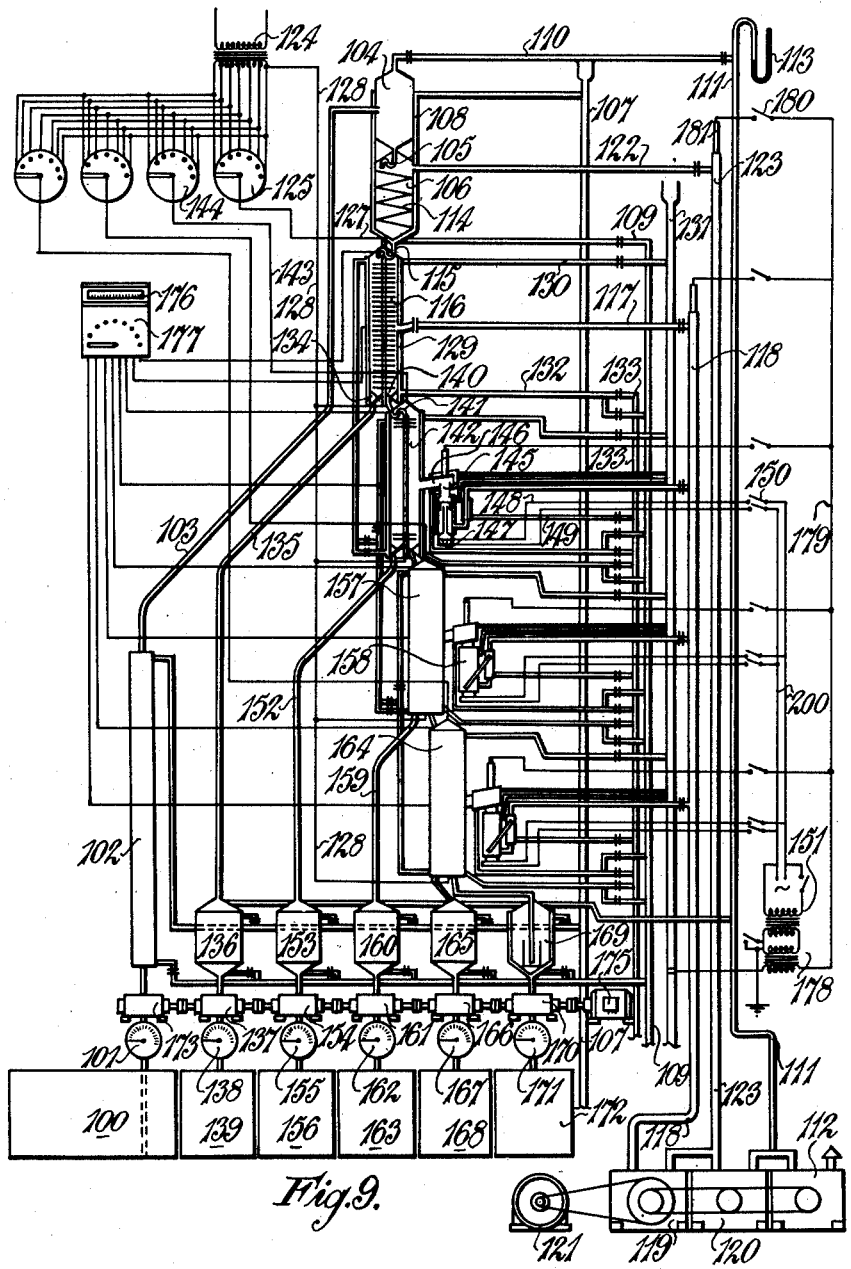

Fig. 6 is a vertical section through a distilling apparatus for distilling distillands which behave in the first mode and which incorporates baffles to prevent the condensate becoming contaminated by splashes or spray from the surface of the distilland; Fig. 7 is a plan view of one of the trays illustrated in Fig. 6; Fig. 8 is part of a vertical section through a modification of the distilling apparatus shown in Fig. 6 suitable for obtaining several fractions from one distilland in a single apparatus and in which the discharge of distillate vapour from the edges of the trays past the edges of the baffles is so directed as to entrain gas and assist in the evacuation of the lower parts of the apparatus; Fig. 9 is a diagram representing the elements of a complete continuous distilling plant for the treatment of organic distillands.

Referring now to Figs. 1, 2 and 3 trays 10 for containing the distilland are clamped between nuts 13 upon bolts 12. The bolts 12 are secured to the lid 14 of a vacuum-tight chamber 15. Distilland is delivered into the chamber and to one end of the topmost tray within the chamber by means of a trapped pipe 16 and flows through a tortuous channel formed by the webs 17 which project from the bottoms of the trays to the lower end of the trays. It is then discharged through a pipe into the next tray below, and thus through all the trays in sequence. From the last tray in the sequence the residue flows through a pipe 18 into a sump 19 whence it is extracted from the apparatus through a trapped pipe 20.

Over each of the several trays 10 an inclined condensing surface 21 is mounted by lugs 22 which are secured between nuts 23 upon bolts 24 depending from the lid 14. The condensing surfaces 21 are maintained at an appropriate temperature by fluid flowing through a pipe 25 which is brazed or otherwise affixed in intimate thermal contact with the condensing surfaces 21. In addition, fluid may be circulated through the jacket 27 around the walls of the chamber by way of the pipes 28 and 29 in order to ensure a condensation of any distillate vapour which may fail to be condensed upon the condensing surfaces 21 and to assist in maintaining the whole apparatus at an appropriate temperature. The trays 10 are heated by fluid circulating through a pipe 26 brazed or otherwise affixed in intimate thermal contact with the bottoms of the trays.

All the permanent joints of the chamber are made in a vacuum-tight manner, for example by welding, and the chamber itself is constructed of sufficient strength to withstand the external atmospheric pressure. The lid 14 is attached by means of one of the well known methods of vacuum sealing.

A pipe 30 is provided in the lid 14 of the chamber and is connected to a pump capable of obtaining and maintaining the highest degree of vacuum, such for example as a mercury condensation pump.

In operation the organic liquid which is to be distilled is delivered to the topmost tray 10 through the pipe 16 after it has been preliminarily treated to remove all dissolved gases. The trays 10 are heated to the desired temperature by fluid such as steam circulating through the pipe 26 and the necessary degree of vacuum is maintained within the apparatus. The distilland is vaporized and the distillate travels across the space between the surface of the distilland and the opposed condensing surface 21 without any appreciable number of intermolecular collisions. The condensing surfaces are maintained at the required temperature, having in view the nature of the condensate, by fluid circulated through the pipe 25. The condensate trickles down the inclined condensing surfaces 21 and off the edges thereof and ultimately is collected at the bottom of the vessel whence it is extracted by means of the trapped pipe 31. The residue, after leaving the last tray by way of the pipe 18, is delivered into the sump 19 and is extracted through the trapped pipe 20.

In Fig. 4 a modification is illustrated in which the condensate from the individual condensing surfaces is separately collected. The individual condensing surfaces are provided with gutters 32 into which the condensate trickles. The condensate collected in the gutters 32 is delivered by pipes such as 33 to gutters 34 arranged upon the walls of the chamber and communicating with trapped pipes 35 by which the condensate can be collected. Separate gutters 34 may be provided for every one of the condensing surfaces in the apparatus, or as shown, two or more condensing surfaces may discharge into a single gutter. With the apparatus illustrated in Fig. 4 a plurality of fractions may be obtained from a single distilland.

In Fig. 5 a modification is illustrated by which the discharge of part of a distillate from the surface of the distilland is caused to assist in the evacuation of the chamber. In this embodiment the edges of the trays 10 are extended somewhat beyond the edges of the condensing surfaces 21. The condensing surfaces 21 are provided with gutters 32 to collect the condensate which may deliver into gutters 34 upon the wall of the apparatus. The passage between the gutters 32 and the edges of the trays 10 is such as to cause some of the distillate to issue in the general direction shown by the arrows. The distillate so issuing is condensed upon the cooled walls of the chamber, and passes into the gutters 34. The distillate issuing between the condensing surfaces and trays entrains some of the residual gas within the chamber and owing to its general upward direction of travel assists in the evacuation of the lower part of the chamber. Consequently it is sufficient to evacuate the upper part of the chamber to a moderate degree of vacuum, such for example as 50 dynes/cm$^2$, in order that the high degree of vacuum necessary for the distillation of the less volatile components, as for example, 1 dyne/cm$^2$, may prevail in the lower part of the chamber.

Referring now to Figs. 6 and 7, the apparatus here shown is of substantially cylindrical form and its walls constitute the condensing surface. The distilland is delivered preferably after the removal of dissolved gases through a pipe 40 to a trap 41 and thence to the topmost of a series of trays 42. The distilland then travels by a tortuous path formed by webs 43 to the outflow 44 of the tray whence it is delivered to the next tray below and so in sequence to the bottom tray of the apparatus.

The trays are of circular form and shaped in section as shown in the drawings. They are preferably constructed of cast metal, such as brass, and are fitted upon a central tube 45 through which heating fluid such as steam can be circulated. The heat from the fluid is conducted through the tube 45 to the body of the trays 42 and thence to the distilland. The trays may alternatively be heated electrically by means of heating elements located in the central tube 45, or affixed to the trays or cast in the trays. Above the topmost tray is disposed a baffle 46 which is heated to substantially the same temperature and in the same manner as the trays 42. The baffle 46 has a depending rim 47 which precludes any particle leaving the surface of the distilland and travelling in an approximately straight path from striking the wall of the chamber which constitutes the condensing surface. The trays 42 are also provided with depending rims 48 which act as baffles to prevent particles thrown from the surface of the distilland contained within the next tray below from striking the condensing surface. In addition also the trays are provided with annular channels 49 into which the drops of distilland, which may be collected on the baffle above, may fall from the depending rims 47 and 48. The annular channels 49 are connected to the underside of the trays by ducts 50 by which the distilland collected in the channels 49 is delivered to the next tray below. The lowermost tray in sequence delivers the residue from its outlet 44 into a sump 51 whence the residue is extracted through a pipe 52.

The walls of the chamber are provided with a complete jacket 53 as is also the pipe 54 by means of which the vessel is evacuated. The pipe 54 is inclined so that any condensate which is condensed therein runs back into the chamber. The condensate, which is condensed upon the walls of the chamber runs down the walls into the annular sump 55 whence it is extracted through a pipe 56.

In the modified apparatus shown in Fig. 8 the outer edges of the trays 42 are formed with upstanding rims so that the issuing distillate is upwardly directed, thus assisting in the evacuation of the chamber in a manner previously explained with reference to Fig. 5. Furthermore gutters 57 are provided at selected points around the walls of the chamber in which the condensate from the part of the chamber immediately above such gutter is collected and pipes 58 are provided for the extraction of the condensate from the gutters 57 so that several fractions can be separated in a single apparatus.

In the general arrangement of distilling plant shown in Fig. 9 the distilland such as crude oil, preferably "topped", that is having the most volatile fractions removed therefrom, is stored in a tank 100 whence it is pumped by a pump 173 through a flow meter 101, a preheater 102 and conduit 103 to the preliminary degassing chamber 104. The preliminary degassing chamber 104 is a simple cylindrical vessel from the lower end of which the oil is discharged through a trap 105 into a secondary degassing chamber 106. The preliminary and secondary degassing chambers 105 and 106 respectively are heated by hot water or other fluid from a hot water pipe line 107 which flows through a jacket 108 to a discharge line 109.

The preliminary degassing chamber 104 is roughly exhausted to a moderate degree of vacuum through a pipe 110 which is connected to a rough vacuum line 111. The rough vacuum line 111 is in turn connected to the rough vacuum pump 112 and a manometer gauge 113 may be connected thereto for indicating the degree of vacuum. The secondary degassing chamber 106 is fitted with a spiral plate or tray 114 in good thermal contact with the walls of the chamber which are heated by the water flowing through the jacket 108. The oil issuing from the trap 105 flows in a thin stream over the spiral plate or tray 114. The secondary degassing chamber 106 is exhausted through a pipe 122 which is connected to the medium vacuum line 123 which is in turn connected to the pump 120. The pump 120 is backed by the pump 112 previously referred to.

The degassed oil issues from the bottom of the chamber 106 through a trapped pipe 115 into the first distilling apparatus 116 which may be of any one of the kinds hereinbefore described but is illustrated as being substantially the same as the kind illustrated in Fig. 6. The distilling apparatus 116 is exhausted through a pipe 117 which is connected to the high vacuum line 118 which is exhausted by the pump 119 backed by the pumps 120 and 112. The three pumps 119, 120 and 112 may be any known type of vacuum pump capable of together obtaining a high degree of vacuum such as the box pumps well known in the art of vacuum pumping. The three pumps 119, 120 and 112 are driven by an electric motor 121. The trays of the distilling apparatus are electrically heated by current supplied through conductors 127 and 128 by a transformer 124 and controlled by a tapping switch 125.

If the distilling apparatus 116 is of the form described with reference to Figs. 6 and 7 or Fig. 8 the electric heating elements may be located within the central tube 45 or they may be attached to or cast in the trays. If the distilling apparatus is of the kind described with reference to Figs. 1, 2 and 3 or Fig. 4 or Fig. 5 the electric heating elements may be attached to the bottoms of the trays or may be cast in the trays.

The walls of the distilling apparatus 116 are maintained at an appropriate temperature by fluid circulated through the jacket 129. It will usually be desirable to keep this jacket as cool as possible, except in case the condensate has a high freezing point, or in case the vapour pressure of the condensate is negligible at temperatures up to 100° C., when the jacket may be allowed to rise as far as 100° C. without detriment to the working of the still.

The jacket 129 is therefore arranged to be capable of connection at its lower (inlet) end by the pipe 132 to either the cold water pipe 133 or the hot water pipe 109, and at its upper (outlet) end to the pipe 131.

The condensate which is collected in the annular sump 134 at the bottom of the distilling apparatus 116 is extracted through a pipe 135, which may be trapped, and is collected under vacuum in a receiver 136 whence it can be extracted by a pump 137 and is discharged therefrom through a flow meter 138 into a tank 139. The residue of the distilling apparatus 116 which collects in the sump 140 is discharged therefrom through a trapped pipe 141 into a second distilling apparatus 142 which is generally similar to the preliminary distilling apparatus 116. The secondary distilling apparatus is heated by current supplied through conductors 143 and 128 from the transformer 124 and is regulated by the tapping switch 144.

The walls of the distilling apparatus 142 are jacketed, and the jacket is supplied with fluid from the pipe 109 or the pipe 133 or the outlet of the preceding distilling apparatus, and discharges the fluid into the pipe 131. The distilling apparatus 142 instead of being connected directly to the high vacuum line 118 is connected to a diffusion pump 145 employing a working fluid which may be mercury or preferably oil, by an inclined passage 146 which is also jacketed. The passage 146 is so inclined that any condensate which may be formed therein flows back into the distilling apparatus 142. The jacket of the passage may be connected to the pipe 133 and to the pipe 131. If condensates are produced which solidify in the passage, the passage-jacket may be connected at intervals to the pipe 109 instead of the pipe 133 so that the said condensate may be liquefied and may flow back into 142, or the passage-jacket may be permanently connected to the pipe 109. It is, however, preferred to keep the passage-jacket cold for the most part, so that the least possible amount of distillate enters the condensation pump as vapour. The jacket of the condensation pump is connected to the cold water pipe 133 and to the discharge pipe 131. The jacket of that part of the fore-vacuum pipe which forms an integral part of the condensation pump may be connected in cascade with the jacket of the body of the condensation pump, this arrangement being preferred when mercury is used as working fluid, or when oil is used as working fluid, it may be preferred to supply the jacket of that part of the fore-vacuum pipe which forms an integral part of the condensation pump with hot water, or alternatively, to omit the said jacket. Heat is supplied to the diffusion pump by an electric heater 147 which is energized through conductors 148 and 149, and double-pole switch 150 from a main supply circuit 200.

The condensate formed in the distilling apparatus 142 is collected in the annular sump at the bottom thereof and is discharged through a pipe 152, which may be trapped, into a receiver 153 whence it is extracted by a pump 154 and delivered through a flow-meter 155 to the tank 156.

The residue is delivered from the sump into a third distilling apparatus 157 which is exhausted by a diffusion pump 158 and is heated in a manner similar to the distilling apparatus 116 and 150

142. The condensate of the distilling apparatus 157 is delivered through a pipe 159 to a receiver 160 whence it is extracted by a pump 161 and delivered through a flow-meter 162 to a tank 163. The residue of the distilling apparatus 157 flows into another distilling apparatus 164 whence the condensate flows into a receiver 165. The condensate is pumped from the receiver 165 by a pump 166 and delivered through a flow-meter 167 to a tank 168. The residue of the distilling apparatus 164 is delivered to a receiver 169 whence it is pumped by a pump 170 through a flow-meter 171 into the tank 172.

The degrees of vacuum and/or evaporating temperatures of the several successive distilling apparatus are progressively raised so that the lighter fractions are distilled off in the earlier apparatus in sequence and are delivered to the earlier tanks while the heavier fractions are delivered to the later tanks in sequence.

The receivers 136, 153, 160, 165 and 169 are all trapped in a manner indicated in the drawings in the case of receiver 169 and are evacuated by a connection to the low vacuum pipe 111. Moreover the receivers 136, 153, 160, 165 and 169 are all similarly jacketed in order that they may be maintained at appropriate temperatures. The preheater 102 is also heated by a water jacket. These water jackets are all heated by water from the pipe 109, and discharge into the pipe 107, leading to a hot well, from which (after subsequent further heating, if desired) water may be pumped to the pipe 109. The pumps 173, 137, 154, 161, 166 and 170 are all driven by the electric motor 175.

In order to indicate the evaporating temperatures of the several distilling apparatus an electrical pyrometer 176 is arranged to be capable of connection by a multi-point switch 177 to any one of several thermo-junctions located within the respective distilling apparatus, the said junctions being preferably brazed, welded or otherwise affixed to the evaporating trays. In order to gauge the degree of vacuum in the several chambers electrical transformers 178 and 151 are connected in cascade to the main supply circuit 200 and to a line 179 and through switches such as 180 to spark gaps 181 which are located in pipes or passages at the same degree of vacuum as the several distilling apparatus. By closing the appropriate switch such as 180 and observing the nature of the discharge at the spark gap associated with any one of the distilling apparatus, the degree of vacuum therein may be estimated.

By employing a process and apparatus of the nature set forth distillation of materials may be effected with a commercially reasonable speed of operation, under a far higher degree of vacuum and consequently at lower temperatures than has heretofore been practical. By this means products heretofore unknown are obtainable. For example, a heavy mineral oil, for example, of viscosity 380 seconds at 100° F. and flash at 430° F., distilled at a residual pressure of about 0.001 mm. of mercury at a temperature of about 90° to 120° C. until about 50% of the distilland is distilled over, a residue is obtained which is a dark brown oil slightly more viscous than the distilland and which has a vapour pressure at room temperature considerably lower than that of mercury. This residue is suitable for use in a condensation pump instead of the mercury normally used. The rate of distillation in the circumstances set forth is reasonably high, being of the order of 0.1 to 0.5 grammes per hour per square centimetre of surface of distilland exposed.

If the material, such as petrolatum, is distilled in a residual pressure of about 0.001 mm. of mercury and at a temperature between about 100° C. and 320° C. about 10% of the condensate which is distilled at the lower temperatures is a colourless oil. The remaining condensate is a paste of a colour gradually darkening as the distillation proceeds. From the paste, a wax can be separated by filter-pressing. The residue is a yellow grease which has a vapour pressure of less than $10^{-6}$ mm. of mercury at 70° C. The vapour pressure is thus so low that this grease can be placed, for example, inside a continuously pumped thermionic valve without detriment to the quality of the valve known as "hardness". The rate of distillation is sufficiently high to render the preparation of such a grease commercially practicable.

When the material, such as the residue from the distillation of crude oil is distilled in like circumstances 30% by weight can be distilled over below the decomposition temperature which is approximately 320° C. The condensate is a thick odourless red oil. The residue is a brittle material of the nature of asphalt.

The process described is suitable for the separation of wax from oils such as lubricating oil. For example, about 70% of the oil sold under the designation of "Shell Cylinder Oil (superheat) B.6" can be distilled without decomposition and with sufficient rapidity to be commercially practicable at a temperature below 307° C. at which decomposition of the oil commences. The condensate is a red-brown paste from which a pale wax can be separated by filter pressing. The residue is a liquid rather more viscous than the original oil. If the distillation is stopped at a temperature of 250° C. the residue, which is about 60% of the original distilland, is apparently less viscous than the original oil.

The process may be utilized for the production of an oil of high setting or freezing point, for example, if a typical heavy cylinder oil is distilled at a temperature of 250° C. the condensate is a pale yellow oil of about half the viscosity of the original oil. The distillate sets or freezes at a temperature just below normal room temperature and is quite solid at temperatures at which the original distilland is quite liquid. 80% of this oil can be distilled over at a temperature below 340° C. which is a temperature at which decomposition commences. The process may be effected with sufficient rapidity for commercial practicability.

A number of other oils can be distilled and in general the condensates are more transparent than the corresponding fractions obtained by the ordinary process of vacuum distillation in stills commercially used for this purpose. Moreover the distillates are in general nearly and in most cases, entirely odourless, and they also possess considerable colour stability. Moreover, oils distilled by the process of the invention may be suitable for use as high grade lubricating oils without the stages of refining by means of absorbent earths at present considered necessary in the production of refined lubricating oils.

It will be appreciated that the above description is given by way of example only and many modifications may be made without departing from the scope of the invention.

We claim as our invention:—

1. A process of distilling liquid organic material that is subject to thermal decomposition comprising vaporizing the material at sub-atmospheric pressure and condensing the distillate upon a surface that is situated at a distance from the surface of the distilland less than the mean free path of a molecule of the distillate vapor.

2. A continuous process of distilling liquid organic material which comprises continuously removing gas therefrom at progressively reduced pressure and distilling the residue at low pressure and forming condensate within a distance from the distilland of approximately the mean free path of a molecule of the distillate, and continuously removing condensate to a greater distance from its distilland.

CECIL REGINALD BURCH.
FRANK EDMUND BANCROFT.